(12) United States Patent
Anderson et al.

(10) Patent No.: US 11,744,377 B2
(45) Date of Patent: Sep. 5, 2023

(54) SUBMERGIBLE STOOL

(71) Applicant: Ledge Lounger, Inc., Katy, TX (US)

(72) Inventors: Christopher Anderson, Fulshear, TX (US); David Bier, Conroe, TX (US)

(73) Assignee: Ledge Lounger, Inc., Katy, TX (US)

( * ) Notice: Subject to any disclaimer, the term of this patent is extended or adjusted under 35 U.S.C. 154(b) by 0 days.

(21) Appl. No.: 18/149,295

(22) Filed: Jan. 3, 2023

(65) Prior Publication Data
US 2023/0210266 A1 Jul. 6, 2023

Related U.S. Application Data

(63) Continuation of application No. 17/025,071, filed on Sep. 18, 2020, now Pat. No. 11,540,640.

(51) Int. Cl.
| | |
|---|---|
| *A47C 9/00* | (2006.01) |
| *A47C 15/00* | (2006.01) |
| *F16B 2/22* | (2006.01) |
| *A47C 1/14* | (2006.01) |

(52) U.S. Cl.
CPC .............. *A47C 15/004* (2013.01); *A47C 1/14* (2013.01); *A47C 9/00* (2013.01); *F16B 2/22* (2013.01)

(58) Field of Classification Search
CPC ......... A47C 15/006; A47C 9/00; A47C 9/007; E04H 4/14
See application file for complete search history.

(56) References Cited

U.S. PATENT DOCUMENTS

| | | | |
|---|---|---|---|
| 89,779 A | 5/1869 | Macferran | |
| 4,950,033 A | 8/1990 | Anderson | |
| 7,261,377 B2 | 8/2007 | Ehud | |
| 7,293,840 B1 | 11/2007 | Schu | |
| 7,350,869 B2 | 4/2008 | Davidson | |
| 7,971,286 B2 | 7/2011 | Dillen, II et al. | |
| D650,184 S | 12/2011 | Hsu | |
| D671,757 S | 12/2012 | Walker et al. | |
| 9,044,091 B2 | 6/2015 | Walker et al. | |
| 10,849,821 B2 * | 12/2020 | Hennessy | A47K 3/282 |
| 2007/0236060 A1 * | 10/2007 | Switzer | A47C 15/006 |
| | | | 297/240 |
| 2009/0134551 A1 * | 5/2009 | Delehanty | C09J 7/38 |
| | | | 264/299 |
| 2011/0185491 A1 * | 8/2011 | Roberts | E04H 4/00 |
| | | | 4/496 |
| 2011/0283454 A1 * | 11/2011 | Springer | A61G 15/005 |
| | | | 5/602 |

(Continued)

*Primary Examiner* — Sarah B McPartlin
(74) *Attorney, Agent, or Firm* — Banner & Witcoff, Ltd.

(57) ABSTRACT

A submergible stool includes a body having a top, a bottom spaced from the top, and a sidewall extending between the top and the bottom and defining an enclosed interior cavity extending between the top, the bottom, and the sidewall. A first aperture is formed in the sidewall proximate the bottom and extends from the enclosed interior cavity to an exterior of the stool. A second aperture is formed in the sidewall proximate the top and extends from the enclosed interior cavity to an exterior of the stool. The apertures are positioned such that when the stool is placed in a body of water, water will flow into the interior cavity through the first aperture, air will be forced out of the second aperture, and the stool will sink to a bottom of the body of water in an upright position.

20 Claims, 15 Drawing Sheets

(56) References Cited

U.S. PATENT DOCUMENTS

| 2012/0054954 | A1  | 3/2012 | Vandiver | |
|---|---|---|---|---|
| 2012/0175919 | A1* | 7/2012 | Kane .................. | A47B 37/04 |
| | | | | 297/158.3 |
| 2013/0031712 | A1* | 2/2013 | Gossett ................ | A47C 3/34 |
| | | | | 4/496 |

* cited by examiner

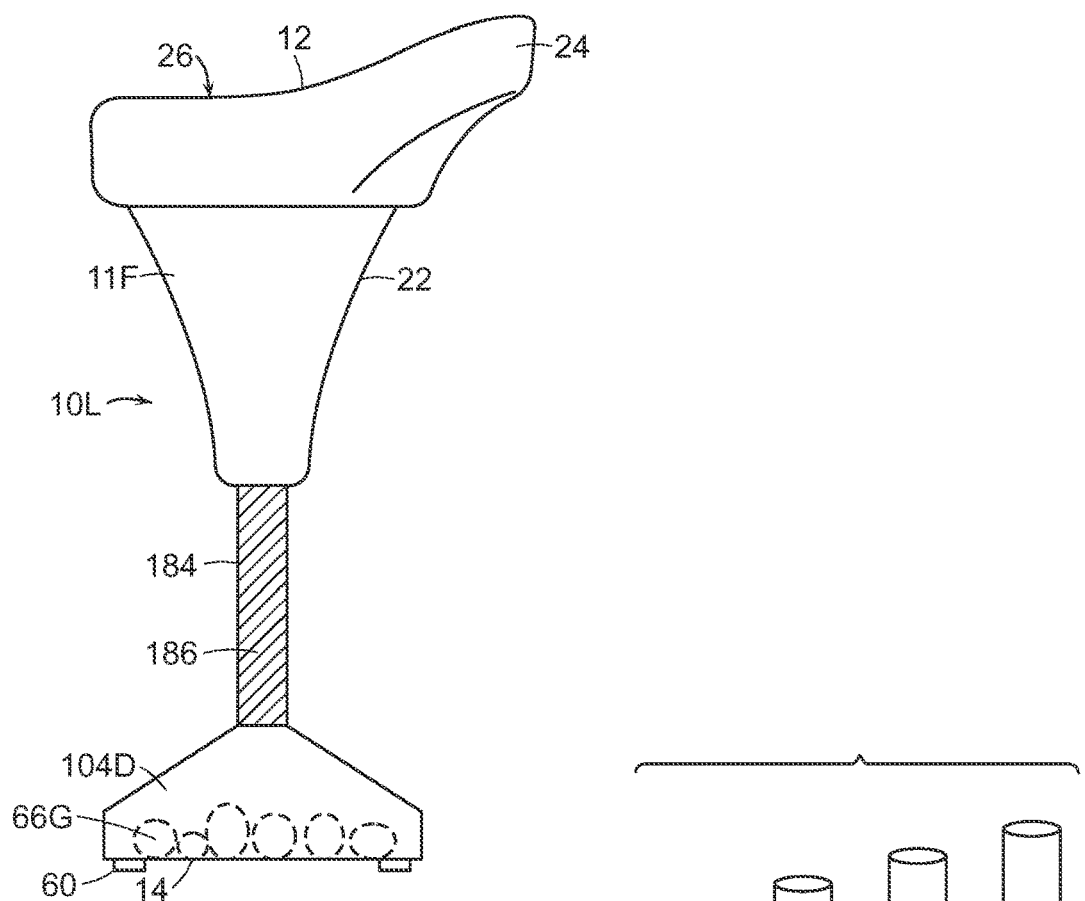
FIG. 31
FIG. 32
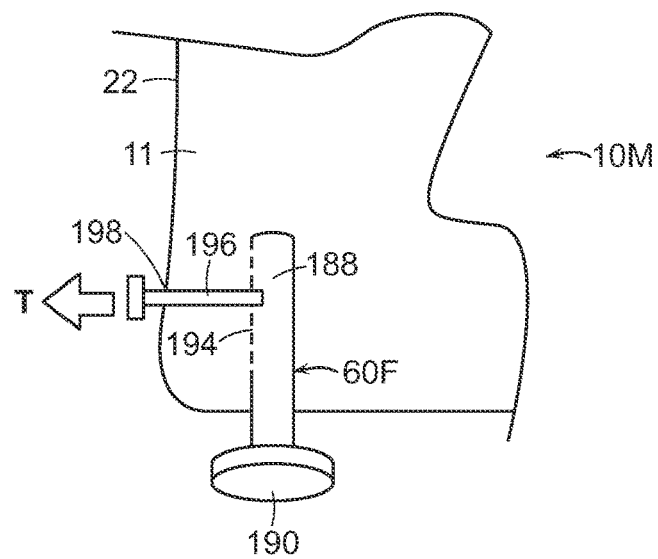
FIG. 33

SUBMERGIBLE STOOL

RELATED APPLICATIONS DATA

This application is a continuation application which claims priority to U.S. patent application Ser. No. 17/025,071, filed on Sep. 18, 2020, issuing as U.S. Pat. No. 11,540,640, which is hereby incorporated by reference in its entirety.

FIELD

Aspects of this invention relate generally to a stool, and, in particular, to a stool that can be submerged in a body of water and right itself to an upright position suitable for a user to sit on.

BACKGROUND

Individuals may often float in a swimming pool in order to cool off and socialize with others. The individuals may rest on inflatable devices that float in the pool. Individuals may also place stools, chairs, or other objects in the pool in order to provide seating.

It would be desirable to provide a stool that is submergible and provides seating for individuals in a swimming pool. Particular objects and advantages will be apparent to those skilled in the art, that is, those who are knowledgeable or experienced in this field of technology, in view of the following disclosure of the invention and detailed description of certain embodiments.

SUMMARY

Aspects of the present invention may be used to advantageously provide a submergible stool that can right itself when dropped into a body of water.

In accordance with a first aspect, a submergible stool includes a body having a top, a bottom spaced from the top, and a sidewall extending between the top and the bottom and defining an enclosed interior cavity extending between the top, the bottom, and the sidewall. A first aperture is formed in the sidewall proximate the bottom and extends from the enclosed interior cavity to an exterior of the stool. A second aperture is formed in the sidewall proximate the top and extends from the enclosed interior cavity to an exterior of the stool. The apertures are positioned such that when the stool is placed in a body of water, water will flow into the interior cavity through the first aperture, air will be forced out of the second aperture, and the stool will sink to a bottom of the body of water in an upright position.

In accordance with another aspect, a submergible stool includes a body having a top, a bottom spaced from the top, and a sidewall extending between the top and the bottom and defining an enclosed interior cavity extending between the top, the bottom, and the sidewall. A first aperture is formed in the sidewall proximate the bottom and extends from the enclosed interior cavity to an exterior of the stool. An additional first aperture is formed in the sidewall proximate the bottom and opposite the first aperture, and extends from the enclosed cavity to an exterior of the stool. A second aperture is formed in the sidewall proximate the top and extends from the enclosed interior cavity to an exterior of the stool. A recess extends inwardly from an outer surface of the sidewall and includes a bottom surface and a rear wall extending upwardly and inwardly from a rear edge of the bottom surface; the first aperture being positioned in the recess. A peripheral wall extends upwardly about a portion of the top and defines a seat. A plurality of threaded recesses extend upwardly into the bottom. Each of a plurality of legs is received in one of the recesses and includes a cover having exterior threads engaging threads of the one of the recesses and a cavity, and a weight received in the cavity of the cover. The apertures are positioned such that when the stool is placed in a body of water, water will flow into the interior cavity through the first aperture and the additional first aperture, air will be forced out of the second aperture, and the stool will sink to a bottom of the body of water in an upright position.

From the foregoing disclosure, it will be readily apparent to those skilled in the art, that is, those who are knowledgeable or experienced in this area of technology, that preferred embodiments of a submergible stool may provide a significant technological advance that allows the submergible stool to be deposited in a body of water and come to rest in a vertical in-use condition. These and additional features and advantages will be further understood from the following detailed disclosure of certain preferred embodiments.

BRIEF DESCRIPTION OF THE DRAWINGS

FIG. 31 is an elevation view of a further alternative embodiment of a submergible stool.

FIG. 32 is an elevation view of a set of legs configured to be used with the submergible stool of FIG. 31.

FIG. 33 is a section view, partially broken away, of an adjustable leg for a submergible stool.

Figure 1:
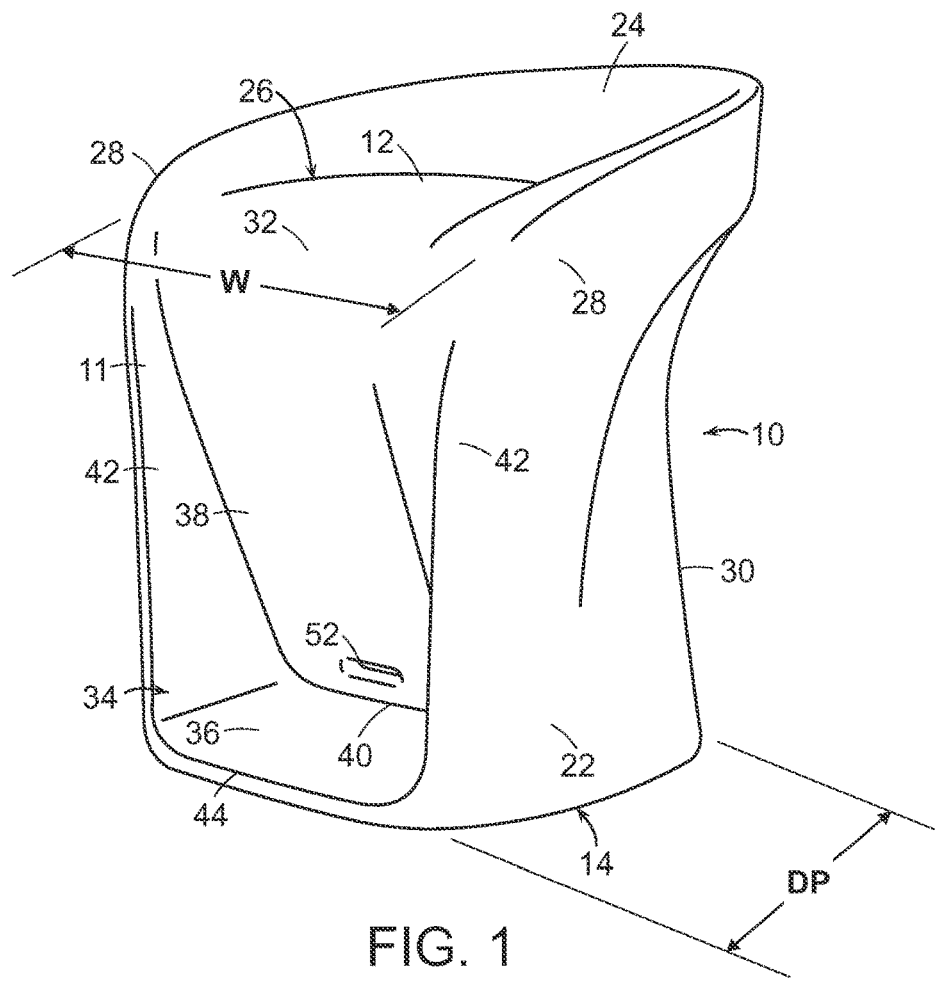
FIG. 1 is a perspective view of a submergible stool.

The figures referred to above are not drawn necessarily to scale and should be understood to provide a representation of the invention, illustrative of the principles involved. Some features of the submergible stool depicted in the drawings have been enlarged or distorted relative to others to facilitate explanation and understanding. The same reference numbers are used in the drawings for similar or identical components and features shown in various alternative embodiments. Submergible stools as disclosed herein would have configurations and components determined, in part, by the intended application and environment in which they are used.

DETAILED DESCRIPTION OF CERTAIN PREFERRED EMBODIMENTS

Figure 2:
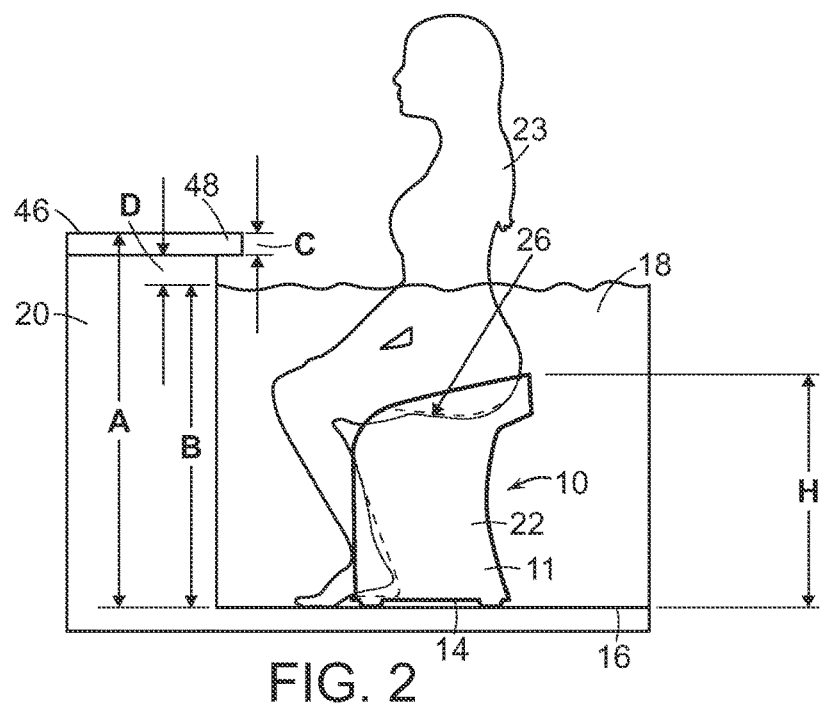
FIG. 2 is a schematic elevation view of the submergible stool of FIG. 1 positioned in a pool with a user seated on the submergible stool.

The present invention may be embodied in various forms. An embodiment of a submergible stool 10 is shown in FIGS. 1-2. For convenience, the terms "upper" and "lower" and "top" and "bottom" are used herein to differentiate between the upper and lower ends of submergible stool 10 and particular components of the stool. It is to be appreciated that "upper" and "lower" and "top" and "bottom" are used only for ease of description and understanding and that they are not intended to limit the possible spatial orientations of the submergible stool or its components during assembly or use.

The term "substantially", as used herein, is meant to mean mostly, or almost the same as, within the constraints of sensible commercial engineering objectives, costs, manufacturing tolerances, and capabilities in the field of submergible stool manufacturing and use. Similarly, the term "approximately" as used herein is meant to mean close to, or about a particular value, within the constraints of sensible commercial engineering objectives, costs, manufacturing tolerances, and capabilities in the field of submergible stool manufacturing and use.

Stool 10 may include a body 11 including a top 12 and a bottom 14 spaced from top 12 and configured to rest on the bottom surface 16 of a body of water 18, such as a pool 20, for example, as seen in FIG. 2. A sidewall 22 of body 11 may extend between top 12 and bottom 14 and define an outer peripheral surface of stool 10.

Stool 10 may include a peripheral wall 24 extending around a portion of top 12 of stool 10 and defining a seat 26 upon which a user 23 may sit while stool 10 is submerged in pool 20. In the illustrated embodiment, peripheral wall 24 extends along opposed sides 28 of stool 10 and around a back or rear 30 of stool 10, leaving a front 32 of stool 10 exposed.

A recess 34 may be formed in front 32 of stool 10. Recess 34 may include a bottom surface 36 proximate bottom 14 of stool 10, a rear wall 38 extending upwardly and forwardly from a rear edge 40 of bottom surface 36, and a pair of opposed recess sidewalls 42 that extend forwardly from rear wall 38.

Bottom surface 36 of recess 34 may act as a footrest upon which user 23 may rest their feet when stool 10 is seated in pool 20. Bottom surface 36 may be sloped downwardly from rear edge 40 to a front edge 44 thereof, which may be more comfortable for the feet of user 23 when they are seated on stool 10.

As seen in FIG. 2, pool 20 may have a depth A measured from a top surface 46 of its deck 48 to its bottom surface 16, while water 18 may have a depth B within pool 20. Deck 48 may have a thickness C where it extends outwardly over water 18 in pool 20. Pool 20 may be filled such that the upper surface of water 18 is spaced from a bottom edge of deck 48 by a distance D. Stool 10 may have a height H.

In certain embodiments, depth A may be approximately 36 inches, depth B may be approximately 30 inches, thickness C may be approximately 2 inches, distance D may be approximately 4 inches, and height H may be approximately 21.5 inches. Such an embodiment illustrates an example of when the deck SS of pool 20 is positioned approximately at table height with respect to user 23 when they are seated on stool 10, as seen in FIG. 2. It is to be appreciated that stool 10 can be configured to have a different height H to accommodate being positioned at a greater depth within pool 20, as discussed in greater detail below. As illustrated in FIG. 1, stool 10 may have a width W and a depth DP. In certain embodiments, width W may be approximately 18.12 inches, and depth DP may be approximately 18.25 inches.

Figure 3:
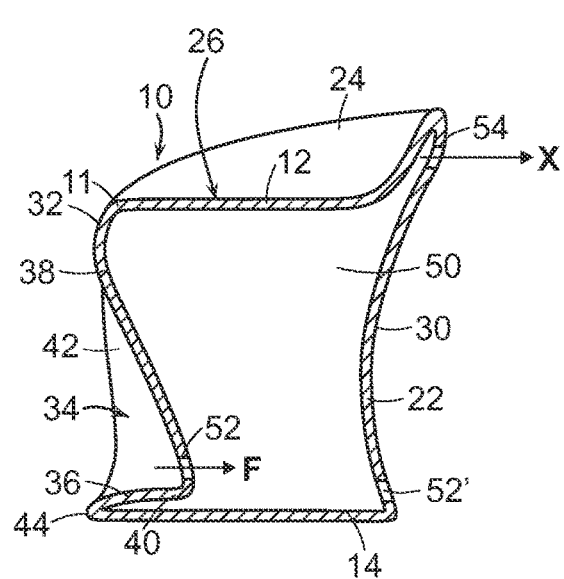
FIG. 3 is a section view of the submergible stool of FIG. 1.

As seen in FIG. 3, top 12, bottom 14, and sidewall 22 may enclose and define an interior cavity 50 of stool 10. A first aperture 52 may be formed in sidewall 22 proximate bottom 14 in front 32 of stool 10, and may extend through sidewall 22 from interior cavity 50 to an exterior of stool 10. A second aperture 54 may be formed in sidewall 22 proximate top 12 in rear 30 of stool 10, and may extend through sidewall 22 from interior cavity 50 to an exterior of stool 10. In the illustrated embodiment, first aperture 52 is formed in rear wall 38 of recess 34, and second aperture 54 is formed in peripheral wall 24.

Figure 4:
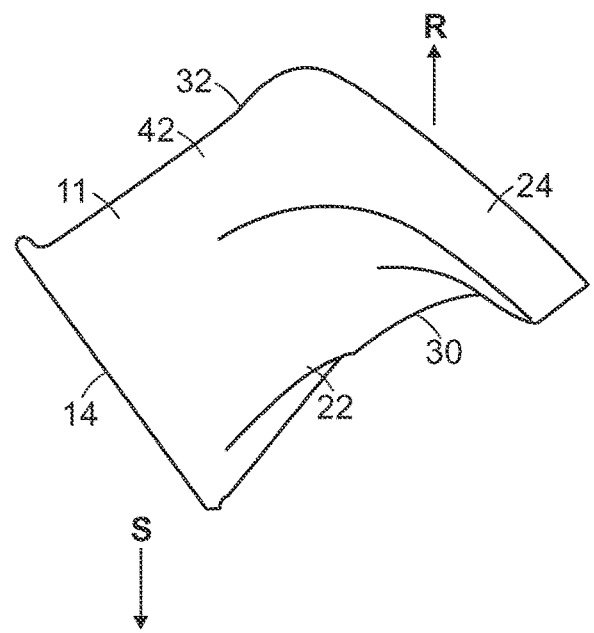
FIG. 4 is an elevation view of submergible stool seen in a condition where it is sinking in a body of water.

First aperture 52 and second aperture 54 are positioned and configured such that when stool 10 is placed and submerged in a body of water, like pool 20, water 18 will flow into interior cavity 50 through first aperture 52 in the direction of arrow F, and air will be forced out of second aperture 54 in the direction of arrow X. As interior cavity 50 fills with water 18 and air leaves interior cavity 50, stool 10 will sink to bottom 16 of pool 20. As illustrated in FIG. 4, stool 10 is self-righting such that as it is dropped into pool 20 and starts to submerge in the direction of arrow S, water 18 will enter and air will exit interior cavity 50, and top 12 of stool 10 will move upwardly in the direction of arrow R as seen in FIG. 4 until stool reaches the upright position illustrated in FIG. 1.

In certain embodiments, as illustrated in FIG. 3, an additional first aperture 52' may be formed in sidewall 22 at rear 30 of stool 10 opposite first aperture 52, which may provide for additional water to flow into interior cavity 50 as stool 10 is submerged in pool 20.

Figure 5:
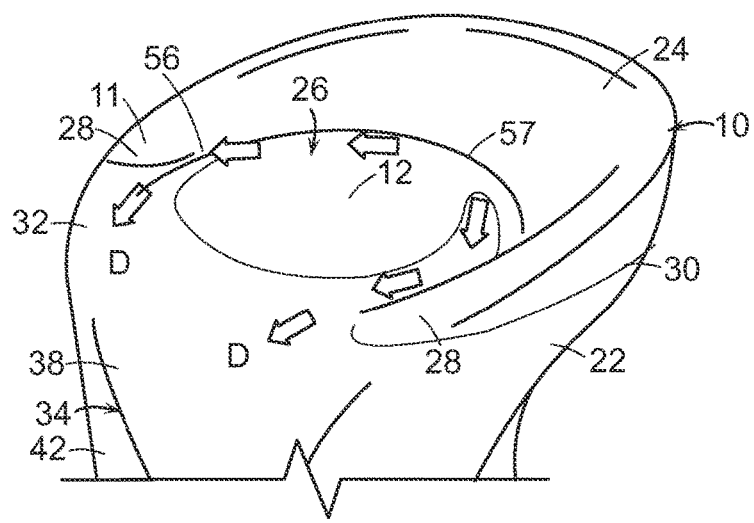
FIG. 5 is a perspective view, partially broken away, showing a seat of the submergible stool of FIG. 1.

In certain embodiments, as illustrated in FIG. 5, a channel 56 may be formed about a periphery of seat 26 and may be sloped downwardly from a rear 57 of seat 26 toward front 32 of stool 32 such that water may flow off of the front of seat 26 in the direction of arrows D, which may be advantageous when stool 10 is positioned on a dry surface, such as the area surrounding pool 20.

Figure 6:
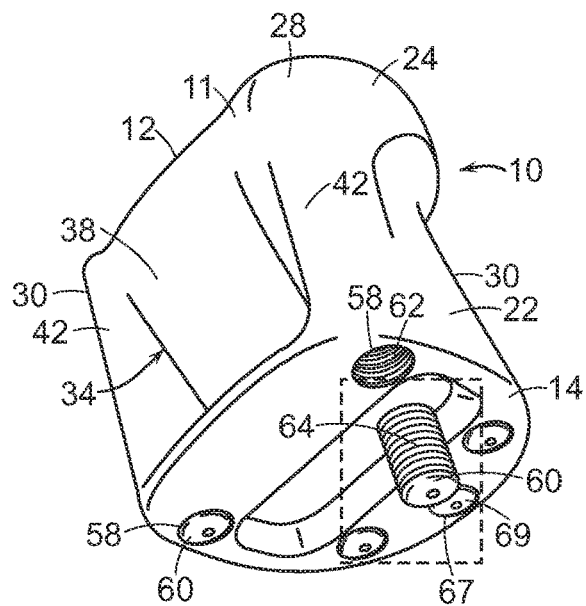
FIG. 6 is a bottom perspective view of the submergible stool of FIG. 1, seen with a leg prior to being inserted into a recess of the stool.
Figure 7:
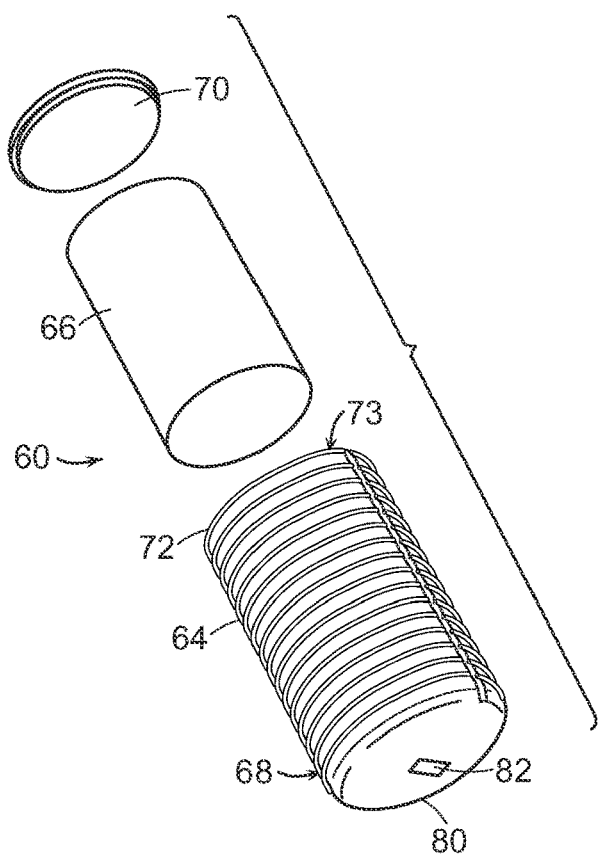
FIG. 7 is an exploded view of leg of FIG. 6.

In certain embodiments, as illustrated in FIGS. 6-7, a plurality of recesses 58 may be formed in bottom 14 of stool 10, and each recess 58 may receive a leg 60. A surface of each recess 58 may include threads 62, which matingly engage threads 64 on an exterior of each leg 60. Legs 60 may provide weight to stool 10 proximate bottom 14, thereby helping maintain stool 10 in its upright position when it is seated in pool 20, and may help right stool 10 when it is dropped into pool 20. In the illustrated embodiment, four recesses 58 are formed in bottom 14 of stool 10, with mating legs 60 being received in each of the four recesses 58. It is to be appreciated that any desired number of recesses 58 and mating legs 60 can be provided for stool 10.

Each leg 60 may include a weight 66 seated in a cover 68, with threads 64 being formed on an exterior of cover 68. A cap 70 may be secured to an open top end 72 of cover 68, sealing insert 66 within a cavity 73 formed in cover 68. Cap 70 and foot 78 may be formed of a plastic or elastomer, e.g., nylon, and cap 70 may be secured to foot 78 by sonic welding or other suitable means. A bottom surface 80 of each foot 78 may include a slot 82 into which a tool, for example, a proprietary tool or a flat-head screwdriver, may be inserted in order to more easily turn foot 78 and position leg 60 at a desired height with respect to stool 10.

In certain embodiments, weight 66 may be a cylindrical rod, and may be formed of metal, such as steel, for example. In certain embodiments, each weight 66 may weigh approximately 2 lbs. It is to be appreciated that weight 66 may be formed of any type of material, and may have any desired weight. By positioning weights 66 in legs 60, the lower portion of stool 10 will weigh more than the upper portion of stool 10, thereby helping stool 10 right itself to an upright condition when it is dropped in pool 20.

Bottom 14 of stool 10 may include A cleanout port 67 may extend through bottom from interior cavity 50 to an exterior of stool 10, and may be used to clean out manufacturing debris, for example, in a post-molding process while stool 10 is being formed. A port plug 69 may be received in cleanout port 67. In certain embodiments, port plug 69 may be permanently secured within cleanout port, such as with an adhesive, for example.

Figure 8:
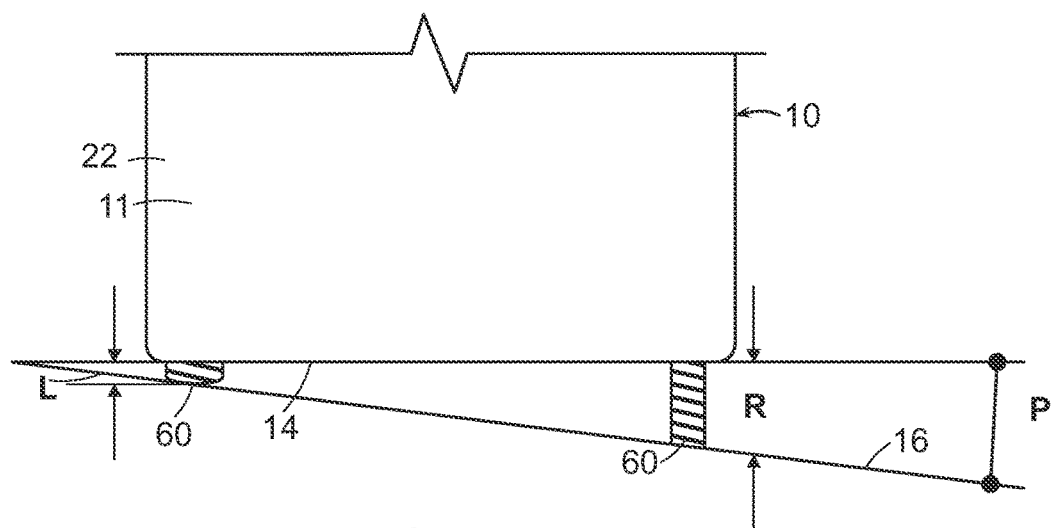
FIG. 8 is a perspective view, partially broken away, of the submergible stool of FIG. 1 seated on an inclined bottom of a pool.

By providing threads on legs 60, the legs 60 can be positioned at different heights, as illustrated in FIG. 8, to accommodate for differences in the slope of bottom 16 of pool 20, thereby allowing stool 10 to be positioned in an upright position even when bottom 16 does not extend horizontally. As seen in FIG. 8, where bottom 16 of pool 20 is sloped at angle P, two of the legs 60 are visible, with the leftmost leg 60 seen here extended to a first distance L, and the rightmost leg 60 extended a greater distance R.

Figure 9:
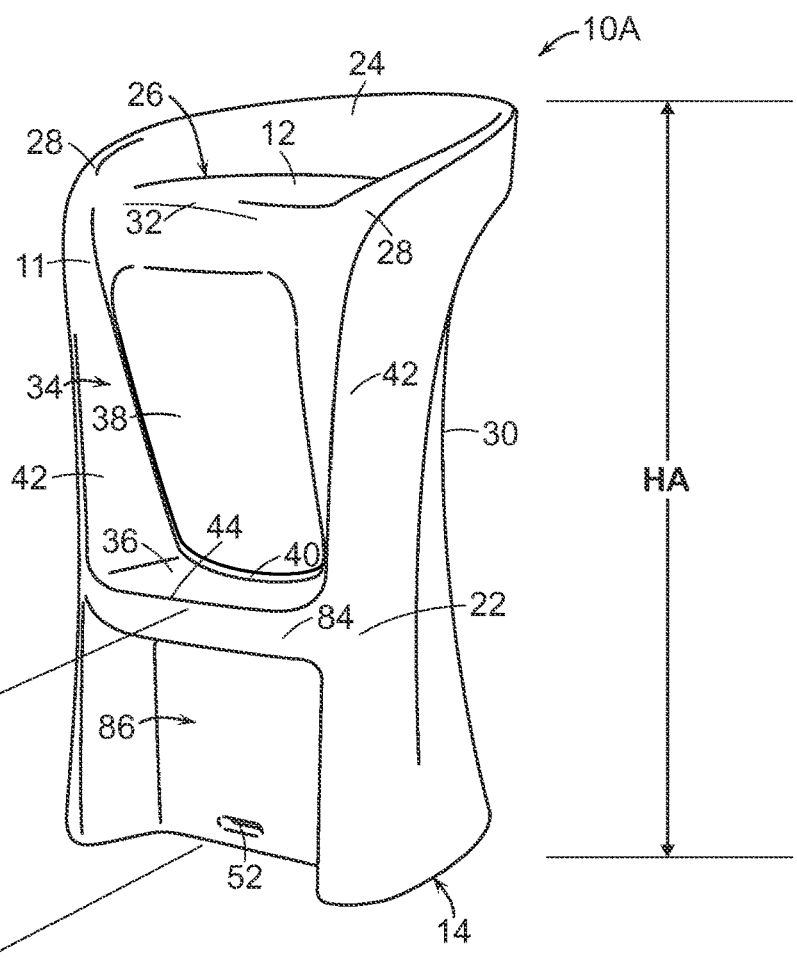
FIG. 9 is a perspective view of an alternative embodiment of a submergible stool.

Another embodiment of a stool 10A is illustrated in FIG. 9. Stool 10A is configured with a greater height H than that of stool 10 illustrated in FIGS. 1-3 in order to accommodate being positioned in pool 20 with a greater depth of water 18. Stool 10A, for example, may have a height HA of approximately 33 inches. Such an embodiment illustrates an example of when the deck 48 of pool 20 is positioned approximately at bar height with respect to user 23 when they are seated on stool 10A.

Stool 10A may be configured such that bottom surface 36 of recess 34 is spaced upwardly from bottom 14 of stool 10A by a distance N. Stool 10A may include a shelf 84 positioned between sidewalls 42, with bottom surface 36 of recess 34 defining the top surface of shelf 84. A bottom recess 86 may be formed in stool 10A beneath shelf 84, with first aperture 52 being formed within recess 86 proximate bottom 14 of stool 10A.

Figure 10:
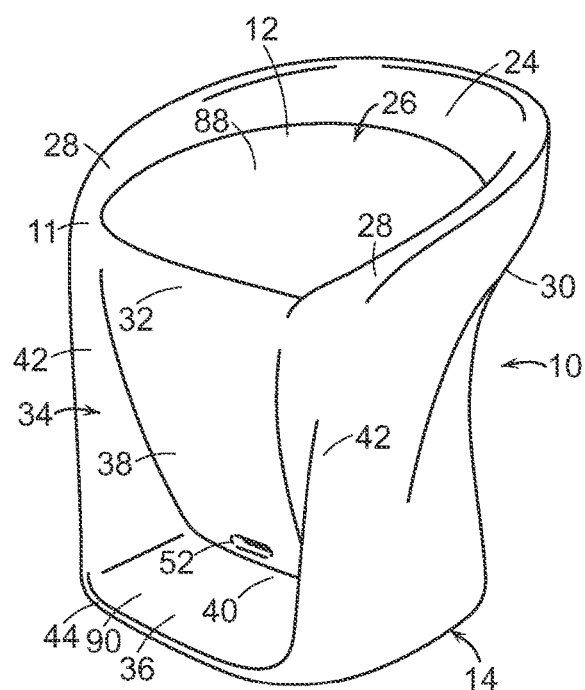
FIG. 10 is a perspective view of another alternative embodiment of a submergible stool.

Another embodiment of stool 10 is shown in FIG. 10, in which seat 26 and bottom surface 36 of recess 34 are textured. It is to be appreciated that a textured surface may be formed on seat 26 and bottom surface during manufacture of stool 10. In other embodiments, a first textured sheet 88 may be secured to seat 26 and a second textured sheet 90 may be secured to bottom surface 36. First textured sheet 88 may be secured to seat 26 and second textured sheet 90 may be secured to bottom surface 36 with an adhesive, for example.

Figure 11:
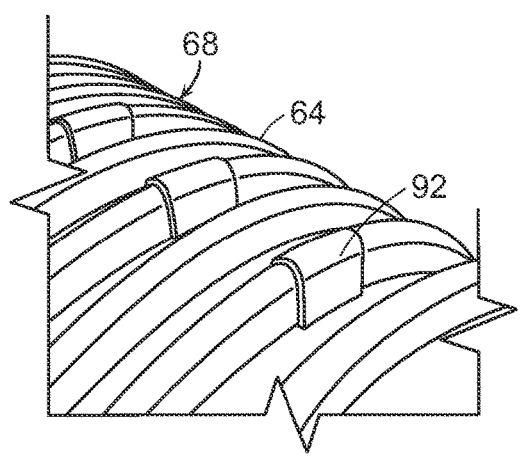
FIG. 11 is a perspective view, partially broken away, of thread clips on threads of the leg of FIG. 6.
Figure 12:
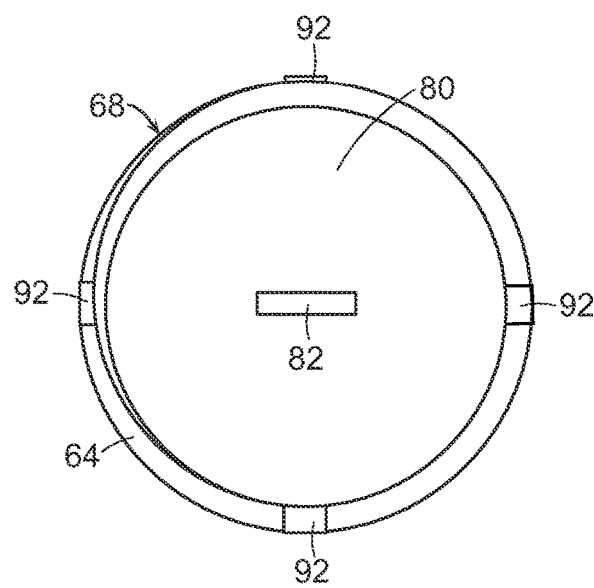
FIG. 12 is a bottom plan view of the leg of FIG. 6.

An alternative embodiment of cover 68 for leg 60 is illustrated in FIGS. 11-12. In this embodiment, a plurality of thread clips 92 are positioned along threads 64 of cover 68. Thread clips 92 may help ensure a tight tolerance fit with threads 62 of recesses 58 in stool 10, while reducing surface area contact. Such a configuration can help provide a tight fit while providing for smooth assembly of legs 60 with stool 10 by the user. Thread clips 92 may be substantially U-shaped projections extending outwardly from threads 64, and may be formed integrally with threads 64 when cover 68 is formed such that threads 64 and thread clips 92 are of unitary, one-piece construction. In other embodiments, thread claims 92 may be separate elements that engage threads 64 in a snap-fit or interference fit, or may be secure to threads 64 with adhesive, for example. Thread clips 92 and cover 68 with threads 64 may be formed of acrylonitrile styrene acrylate ("ASA"), or injection molded plastic, for example. In certain embodiments, thread clips 92 may be positioned at 90° intervals about cover 68 on every other thread 64.

Figure 13:
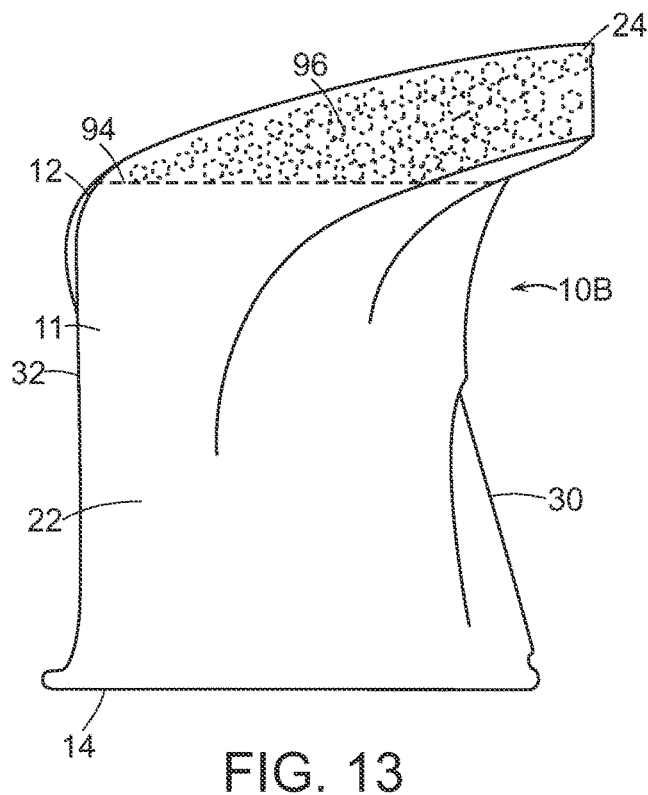
FIG. 13 is an elevation view of a further alternative embodiment of a submergible stool.

Another embodiment of a stool 10B is illustrated in FIG. 13, in which an upper cavity 94 may be formed in stool 10B. Upper cavity 94 may be positioned proximate top 12 of stool 10B, and may be positioned within peripheral wall 24. A plurality of inserts 96 may be received in upper cavity 94. Inserts 96 may be formed of a lightweight material, which is lighter than the material used to form stool 10B, and serve to help stool 10B right itself when submerged in water. By having lightweight inserts 96 seated in cavity 94, the upper portion of stool 10B will weigh less than the lower portion of stool 10B, thereby helping stool 10B right itself to an upright condition when it is dropped in pool 20. Inserts 96 may be formed of Styrofoam, for example. Other suitable materials for inserts 96 will become readily apparent to those skilled in the art, given the benefit of this disclosure.

Although first apertures 52, 52' and second aperture 54 are not visible here, it is to be appreciated that this embodiment of stool 10B may include such apertures, which may help stool 10B right itself when submerged in pool 20. Further, it is to be appreciated that the additional embodiments of stool 10 described below, some of which are shown in schematic fashion, also may include such apertures even though such apertures are not visible in the drawings provided below.

Figure 14:
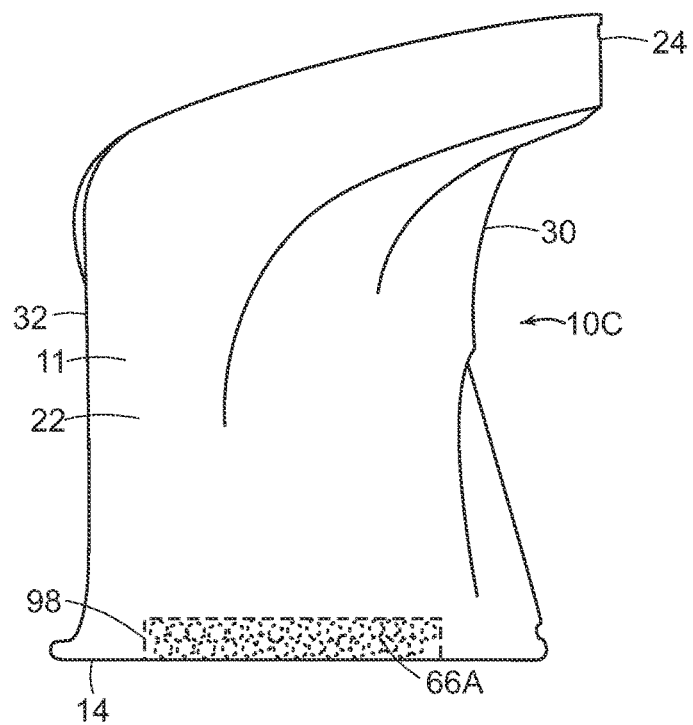
FIG. 14 is an elevation view of yet another alternative embodiment of a submergible stool.

Another embodiment of a stool 10C is illustrated in FIG. 14, in which a lower cavity 98 may be formed in stool 10C. Lower cavity 98 may be positioned proximate bottom 14 of stool 10C. A plurality of weights 66A may be received in lower cavity 98. Weights 66A may be formed of a material that is heavier than the material used to form stool 10B, and serve to help stool 12C right itself when submerged in water. By having weights 66A seated in cavity 98, the lower portion of stool 12B will weigh more than the upper portion of stool 12C, thereby helping stool 12C right itself to an upright condition when it is dropped in pool 20. Weights 66A may be sand, gravel, cement, ball bearings, or any other material that would provide for additional weight within lover cavity 98. Other suitable material for weights 66A will become readily apparent to those skilled in the art, given the benefit of this disclosure.

Figure 15:
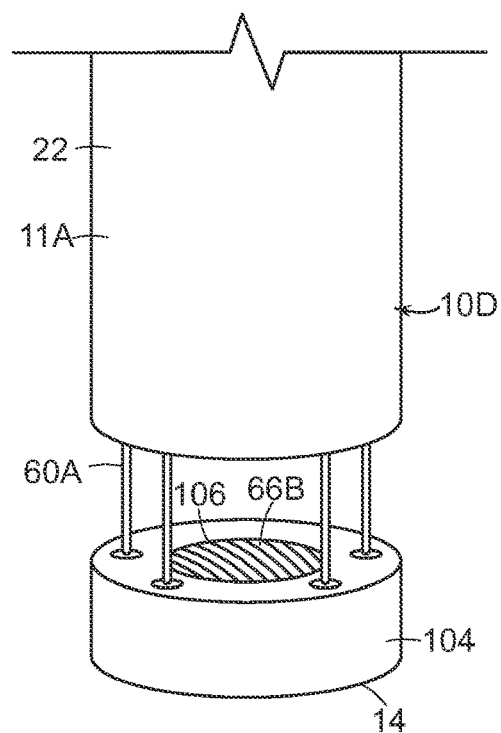
FIG. 15 is a perspective view of a submergible stool with a base spaced from the body of the stool.
Figure 16:
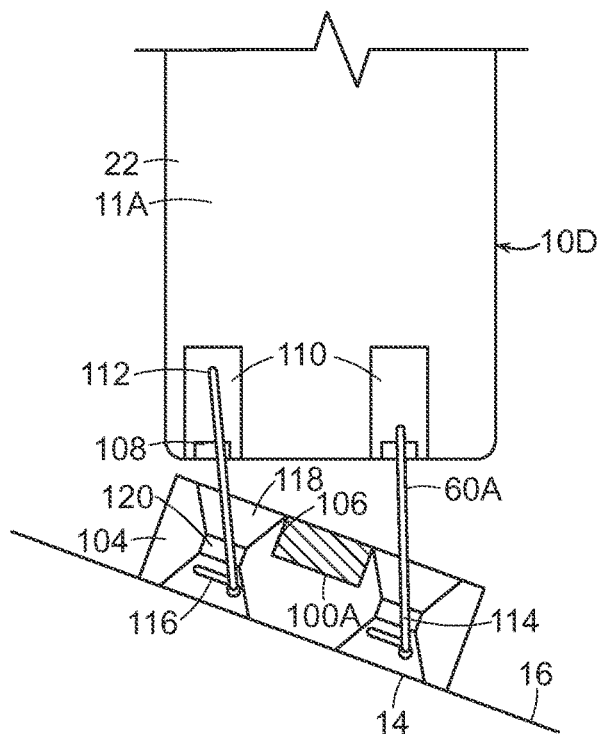
FIG. 16 is a section view of the submergible stool of FIG. 15.

Another embodiment of a stool 10D is illustrated in FIGS. 15-16, and may include a body 11A defined by sidewall 22, and a base 104 spaced from body 11A. In such an embodiment, a bottom surface of base 104 defines bottom 14 of stool 10D. A weight 66B may be seated in a recess 106 formed in a top surface of base 104. Weight 66B may be a cylindrical disk and may be formed of metal, for example, and helps provide additional weight to a lower portion of stool 10D, thereby helping ensure that stool 10D rights itself to an upright position when it is submerged in water.

Base 104 may be adjustably secured to body 11A by a plurality of legs 60A extending between base 104 and body 11A. Legs 60A may be threaded rods 106 that allow for base 104 to be adjusted or angled with respect to body 11A, thereby allowing body 11A of stool 10D to be vertically aligned when bottom 14 is seated on a sloped or inclined bottom 16 of pool 20.

Legs 60A may extend through threaded female inserts 108 seated in the bottom of cavities 110 formed in a bottom of body 11A, such that upper ends 112 of legs 60A are received in cavities 110. Lower ends 114 of legs 60A may be received by pivotable knobs 116 that are seated in cavities 118 formed in base 104. Cavities 118 may have a reduced thickness neck 120 in a central portion thereof, which prevents knobs 116 from moving upwardly through cavities 118. By adjusting legs 60A to different heights, as seen in FIG. 16, the user can ensure that body 11A of stool 10D is vertically aligned when bottom 16 of pool 20 is sloped or inclined.

Figure 17:
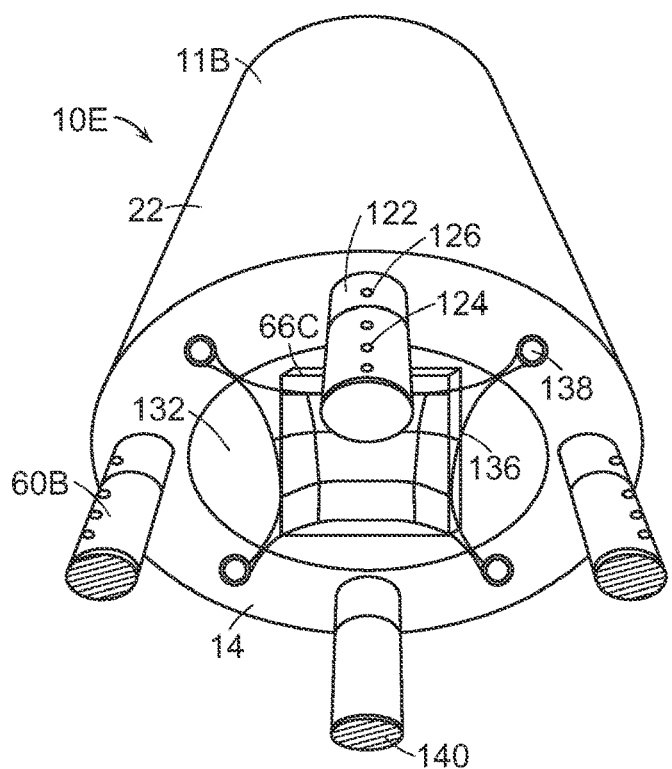
FIG. 17 is a perspective view of a submergible stool with telescoping legs.
Figure 18:
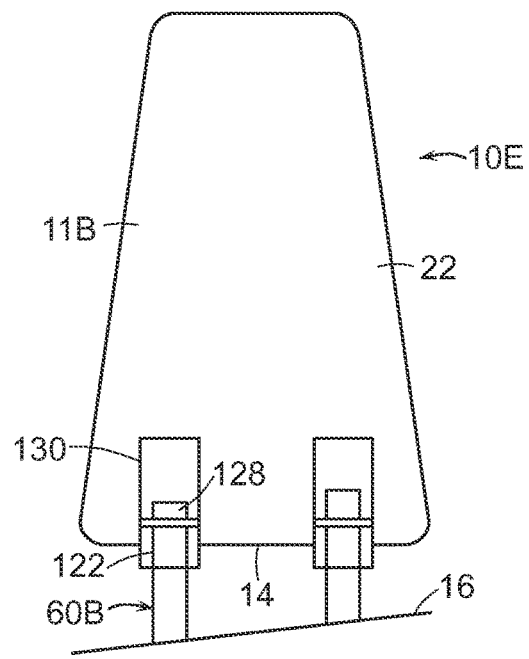
FIG. 18 is a section view of the submergible stool of FIG. 17.

Another embodiment of a stool 10E is illustrated in FIGS. 17-18, and may include a body 11B defined by sidewall 22. A plurality of adjustable legs 60B may extend downwardly from bottom 14 of body 11B of stool 10E. In the illustrated embodiment four legs 60B are positioned about bottom 14. However, it is to be appreciated that any number of legs 60B can be positioned about bottom 14.

Each leg 60B may be telescopically received in a leg housing 122 secured to bottom 14 of stool 10E. Legs 60B may be hollow cylindrical members, and may be formed of metal, e.g., aluminum. A plurality of apertures 124 may extend in a row along each leg 60B. A retractable button 126 on each leg housing 122 may be selectively received in one of apertures 124 in leg 60B as leg 60B is moved upwardly or downwardly and telescopingly received in leg housing 122. An upper end 128 of each leg 60B may be received in a cavity 130 formed in bottom 14 of stool 10E as leg 60B moves upwardly and downwardly with respect to leg housing 122. As seen in FIG. 18, by adjusting the heights of legs 60B, body 11B of stool 10E can be maintained in an upright vertical position when legs 60B are seated on an inclined or sloped bottom 16 of pool 20.

A recess 132 may be formed in a central portion of bottom 14 of body 11B, and may serve to receive a weight 66C. A net 136 may be suspended beneath recess 132, and may serve to retain weight 66C within recess 132. Net 136 may be formed of a flexible, stretchable material such as silicone, for example, which allows a user to easily insert and remove weight 66C. Net 136 may be suspended from posts 138 extending outwardly from bottom 14 around recess 132. Weight 66C may have any desired configuration such as a bag filled with sand or ball bearings, or a weighted disc, for example. The use of weight 66C may allow the lower portion of stool 10E to weigh more than the upper portion of stool 10E, thereby helping stool 10E right itself to an upright condition when it is dropped in pool 20.

A tread 140 may be secured to the bottom of each leg 60B to provide grip and traction on bottom 16 of pool 20. Tread 140 may be formed of rubber or any other suitable soft and pliable material that can provide grip and traction for leg 60B on bottom 16.

Figure 19:
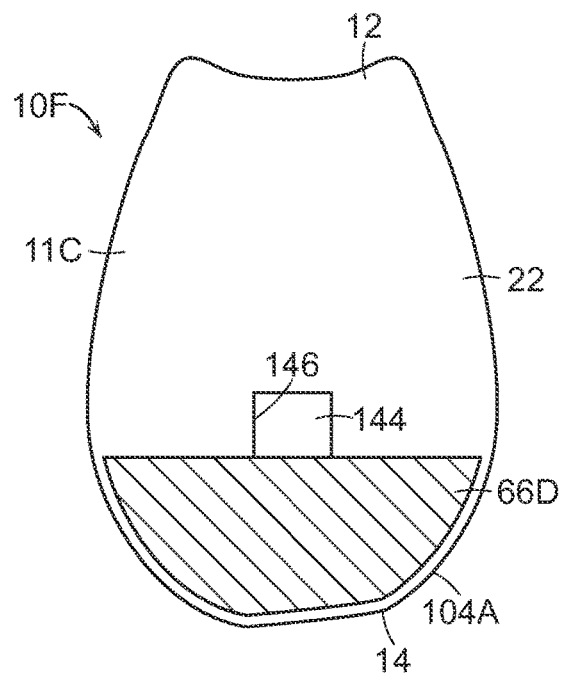
FIG. 19 is a section view of an alternative embodiment of a submergible stool with a weighted base.
Figure 20:
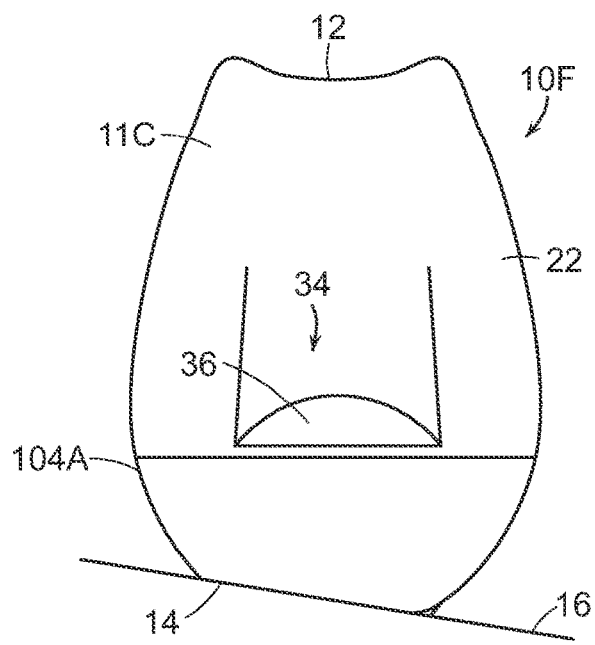
FIG. 20 is an elevation view of the submergible stool of FIG. 19 on an inclined bottom of a pool.

Another embodiment of a stool 10F is illustrated in FIGS. 19-20, and may include a body 11C defined by sidewall 22. A base 104A may be secured to body 11C by way of a projection 144 extending upwardly from base 104A that is received in a mating recess 146 formed in a bottom of body 11C. Projection 144 and recess 146 may engage one another in a press-fit or interference manner so as to secure base 104A to body 11C. It is to be appreciated that in other embodiments projection 144 could be formed on body 11C and recess 146 could be formed in base 104A.

Base 104A may be formed of a flexible and pliable material, such as silicone, for example, that allows its bottom 14 to be altered to adapt to inclined or sloped bottom 16 of pool 20. A weight 66D may be received in base 104A, and may serve to allow the lower portion of stool 10F to weigh more than the upper portion of stool 10F, thereby helping stool 10F right itself to an upright condition when it is dropped in pool 20. Weight 66D may be sand, for example, which can easily conform to the changing shape of the bottom 14. As seen in FIG. 20, when bottom 16 of pool 20 is sloped or inclined, bottom 14 of base 104A can shift and conform to mate with the sloped surface of bottom 16, thereby helping ensure that body 11C of stool 12F maintains its upright vertical position.

Figure 21:
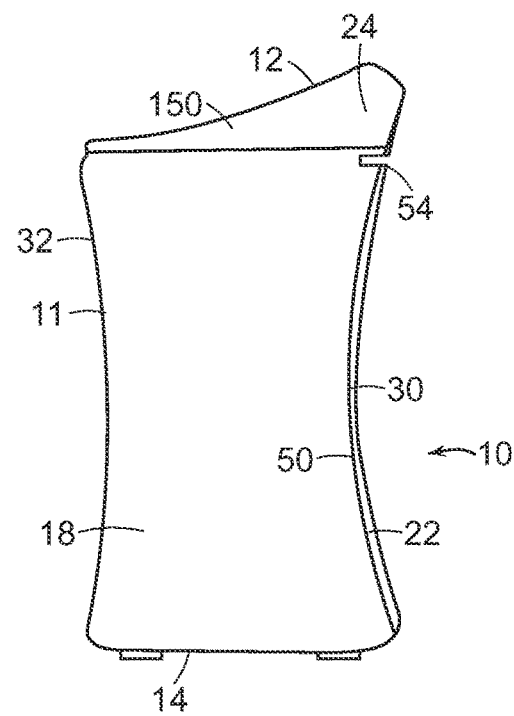
FIG. 21 is a section view of an alternative embodiment of a submergible stool with an air filled cavity proximate a top of the stool.

In certain embodiments, as illustrated in FIG. 21, second aperture 54 may be spaced downwardly from a top of peripheral wall 24 such that when water 18 fills interior cavity 50, a pocket 150 of air will be trapped beneath top 12 and peripheral wall 24 of stool 10, which will make the upper portion of stool 10 weigh less than the lower portion of stool 1,0 thereby helping stool 10 right itself to an upright condition when it is dropped in pool 20.

Figure 22:
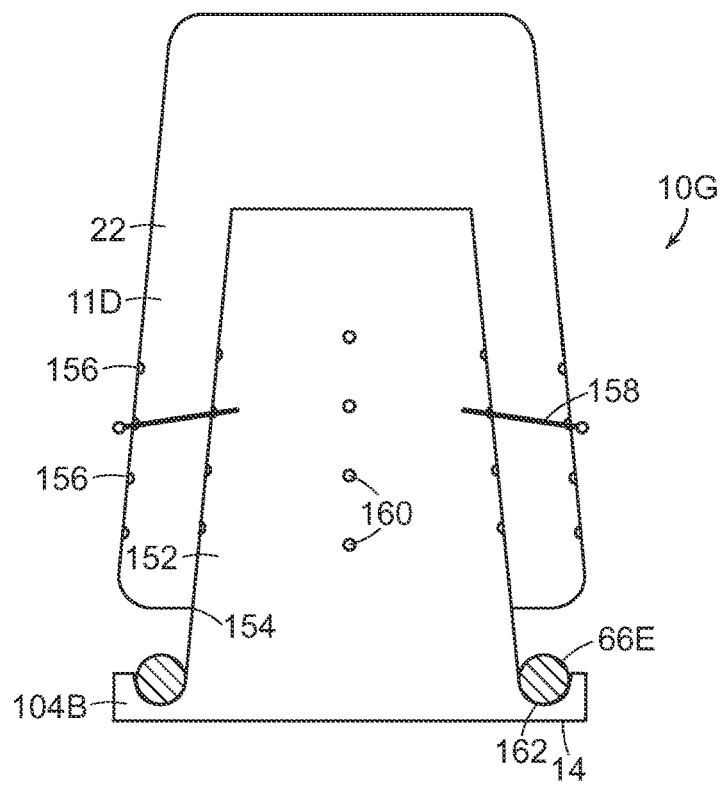
FIG. 22 is a section view of an alternative embodiment of a submergible stool with a weighted base.
Figure 23:
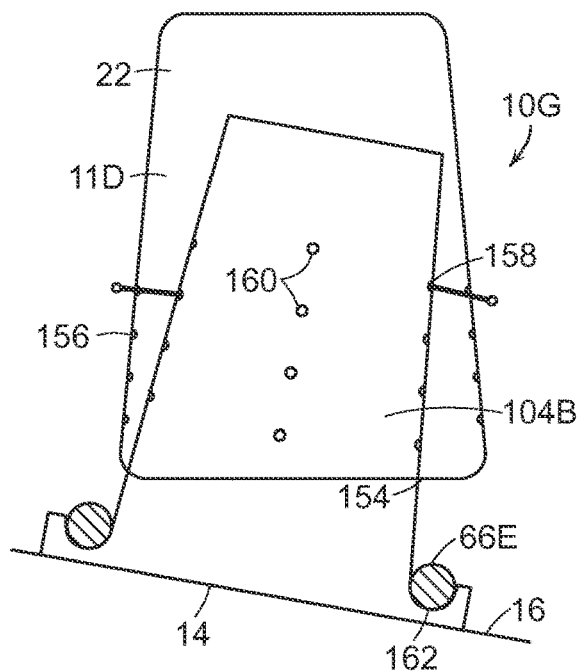
FIG. 23 is a section view of the submergible stool of FIG. 22, shown with the base angled with respect to body of the stool.

Another embodiment of a stool 10G is illustrated in FIGS. 22-23, with stool 10G including a body 11D and a base 104B positioned below body 11D. Base 104B may include a central projection 152 that extends upwardly through an aperture 154 formed in a bottom of body 11D into an interior of body 11D. A plurality of columns of body apertures 156 may be formed in body 11D. Pins 158 may be removably inserted through body apertures 156 into base apertures 160 formed in base 104B, which arranged in a plurality of columns. By selectively inserting pins 158 in different body apertures 156 and base apertures 160, base 104B can be tilted with respect to body 11D so that bottom 14 of stool can be seated flush on an inclined bottom 16 of pool 20 while body 11D of stool 10G is in a vertical upright position.

A weight 66E may be positioned on base 104B. By providing weight 66E on base 104*b*, the lower portion of stool 10G in configured to weigh more than the upper portion of stool 10G, thereby helping stool 10G right itself to an upright condition when it is dropped in pool 20. Weight 66E may be a ring seated in an annular recess 162. In other embodiments, weight 66E may be a ring shaped container, e.g., a bag, into which weighted elements (e.g., sand, ball bearings, rocks, gravel) may be positioned.

Figure 24:
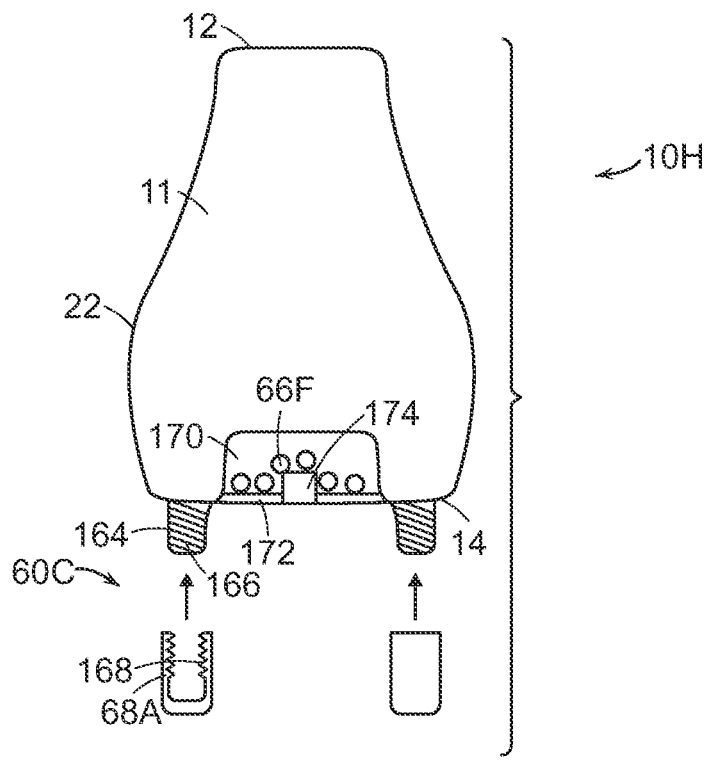
FIG. 24 is an elevation view of an alternative embodiment of a submergible stool with adjustable legs.
Figure 26:
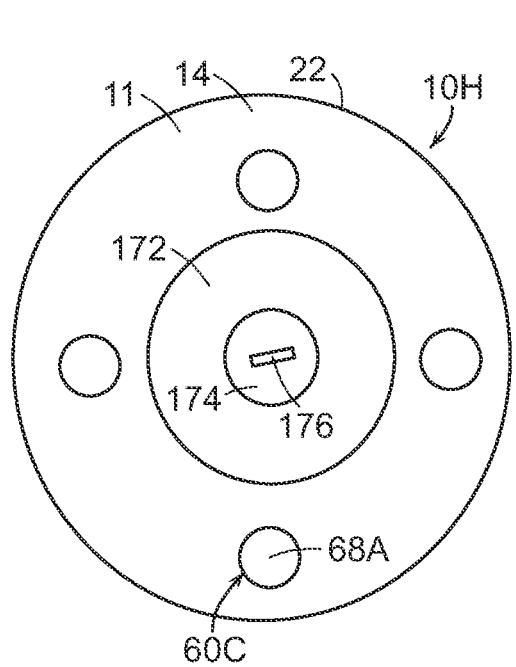
FIG. 26 is a bottom view of the submergible stool of FIG. 24.
Figure 25:
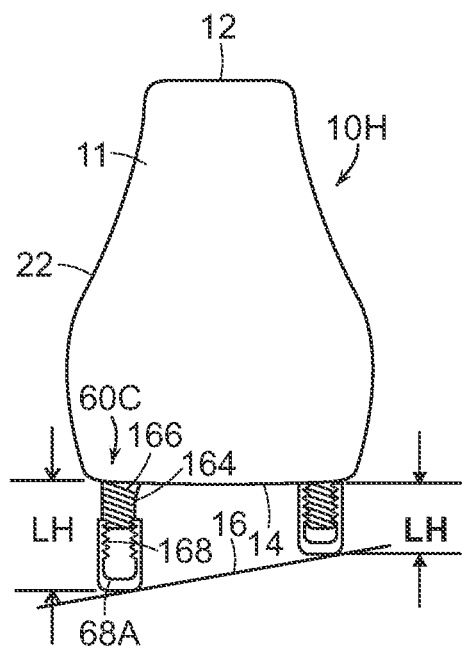
FIG. 25 is an elevation view of the submergible stool of FIG. 24 shown on an inclined bottom of a pool.

Another embodiment of a stool 10H is seen in FIGS. 24-26, and may include a plurality of legs 60C. Each leg 60C may include a base 164 with exterior threads 166. Covers 68A for legs 60C may include internal threads 168 that mate with exterior threads 166 when cover 68A is threaded onto base 164. In certain embodiments, four legs 60C are provided on bottom 14 of stool 10H. It is to be appreciated that any number of legs 60C can be provided on stool 10H.

A cavity 170 may be formed on bottom 14 of body 11 of stool 10H. A cover 172 may seal cavity 170, and a removable plug 174 may be threadingly received in cover 172. A slot 176 may be formed in plug 174 such that a proprietary tool or a screwdriver, for example, can be used to unthread and remove plug 174. Weights 66F may be seated in cavity 170 and provide the lower portion of stool 10H with more weight than the upper portion of stool 10H, thereby helping stool 10H right itself to an upright condition when it is dropped in pool 20. Weights 66F may be rocks, gravel, ball bearings, sand, or any other weighted elements.

As illustrated in FIG. 26, by adjusting the amount that each cover 68A is threaded onto its respective base 164, the total height LH of each assembled leg 60C can be different than the other legs 60C so that stool 10H can be in an upright vertical position when it is seated on an inclined bottom 16 of pool 20.

Figure 27:
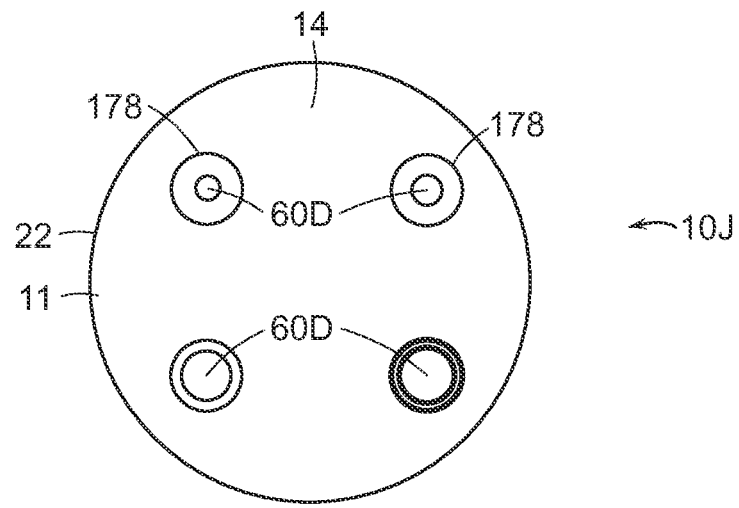
FIG. 27 is a bottom view of another alternative embodiment of a submergible stool.
Figure 28:
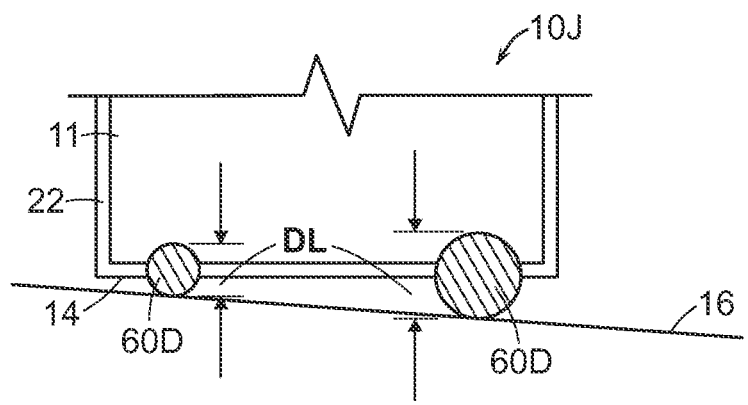
FIG. 28 is a section view of the submergible stool of FIG. 27 shown on an inclined bottom of a pool.

Another embodiment of a stool 10J is illustrated in FIGS. 27-28, in which legs 60D are formed as spheres seated in recesses 178 formed in bottom 14 of body 11 of stool 10J. The diameter DL of the individual legs 60D can be varied to accommodate the inclined bottom 16 of pool 20. Legs 60 may be formed of rubber or any other suitable soft and pliable material that can provide grip and traction for legs 60D on bottom 16.

Figure 29:
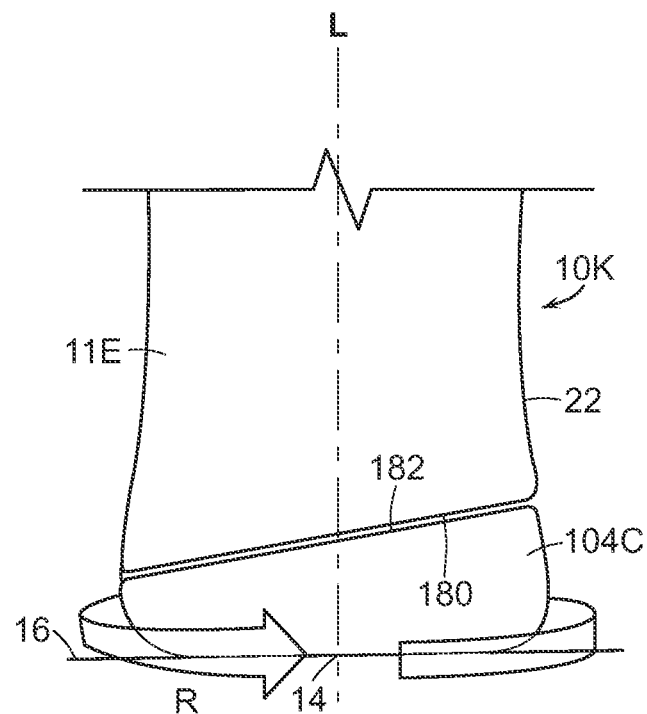
FIG. 29 is an elevation view, partially broken away, of yet another alternative embodiment of a submergible stool having a base rotatable with respect to the body of the stool.
Figure 30:
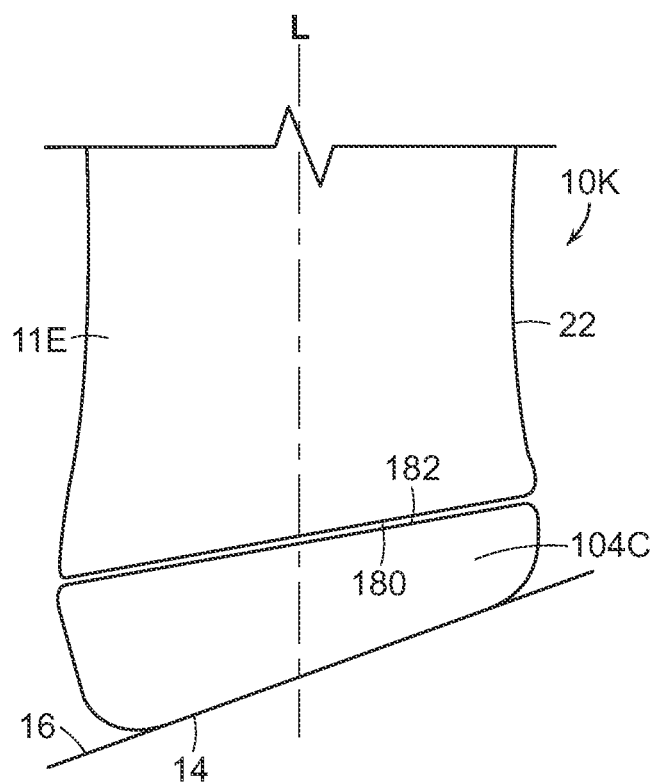
FIG. 30 is an elevation view of the submergible stool of FIG. 29 shown on an inclined bottom of a pool.

Another embodiment of a stool 10K is illustrated in FIGS. 29-30, and includes a body 11E and a base 104C pivotally secured to base 11E. Base 104C and body 11E may be pivotally secured in any manner, such as with a ball and socket (not visible), for example. Body 11E may have a bottom surface 180 that is angled with respect to a longitudinal axis L of stool 10K, and base 104C has top surface 182 that is also angled with respect to longitudinal axis L. Bottom surface 180 and top surface 182 are angled the same amount with respect to longitudinal axis L such that they abut one another as base 104C is rotated with respect to body 11E, as illustrated by arrow R in FIG. 29.

By angling bottom surface 180 and top surface 182, the bottom 14 of stool 10K can be varied from a horizontal position as seen in FIG. 29, to an inclined position as seen in FIG. 30, which allows body 11E of stool 10K to maintain its upright vertical position whether bottom 16 of pool 20 is horizontal as seen in FIG. 29 or inclined as seen in FIG. 30.

Another embodiment of a stool 10L is illustrated in FIG. 31. In this embodiment, body 11F may be connected to base 104D by way of a shaft 184 having threads 186 that are received in mating threads formed in body 11F (not visible). Thus, body 11F can be vertically adjusted with respect to base 104D, allowing stool 10L to be configured for different depths of pool 20.

Weights 66G may be seated within base 104D so that the lower portion of stool 10L will weigh more than the upper portion of stool 10L, thereby helping stool 10L right itself to an upright condition when it is dropped in pool 20. Weights 66G may be rocks, gravel, ball bearings, sand, or any other weighted elements.

Legs 60 may be provided in base 104D at bottom 14 of stool 10L, and they may be threaded, as discussed above with respect to FIGS. 6-8, so that the height of individual legs 60 can be adjusted. In other embodiments, as illustrated in FIG. 32, a set or kit of legs 60E having different lengths can be provided for base 104D so that stool 10L. Thus, in either embodiment stool 10L can be configured to remain in an upright vertical position when bottom 16 of pool 20 is inclined.

Another embodiment of a stool 10M is illustrated in FIG. 33, in which legs 60F include a shaft 188 and a foot 190 at a bottom of shaft 188. Shaft 188 may include a series of apertures 194 that selectively receive a pin 196 extending inwardly into housing 11 through an aperture 194. To adjust the height of leg 60F, pin 196 may be pulled outwardly in the direction of arrow T such that pin 196 is pulled out of an aperture 194 in leg 60 F. Leg 60F can then be vertically adjusted to a new height, and pin 196 can then be inserted into a new aperture 194 along shaft 188. Thus, legs 60F can be individually adjusted to different heights to accommodate an inclined bottom 16 of pool 20.

Figure 34:
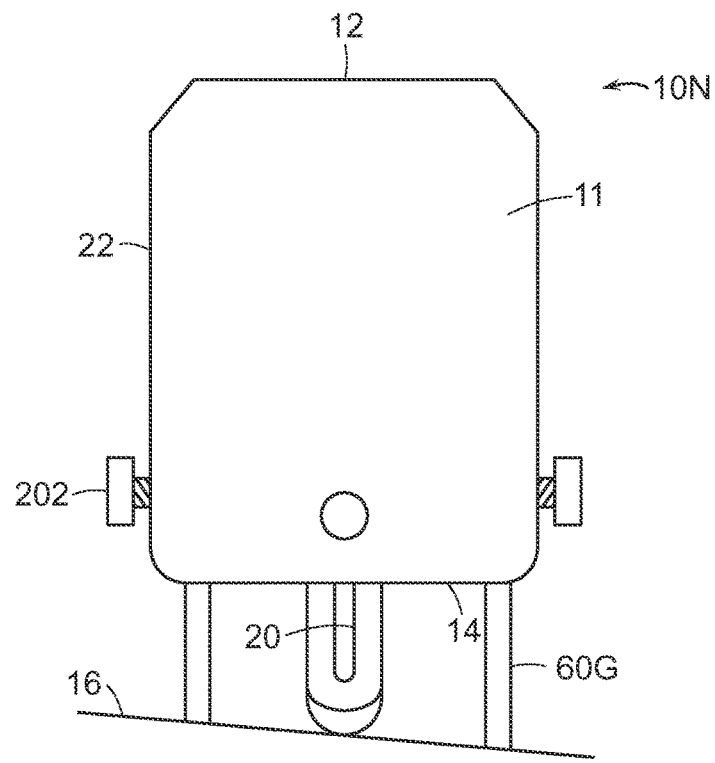
FIG. 34 is an elevation view of an embodiment of a submergible stool shown on an inclined bottom of a pool.
Figure 35:
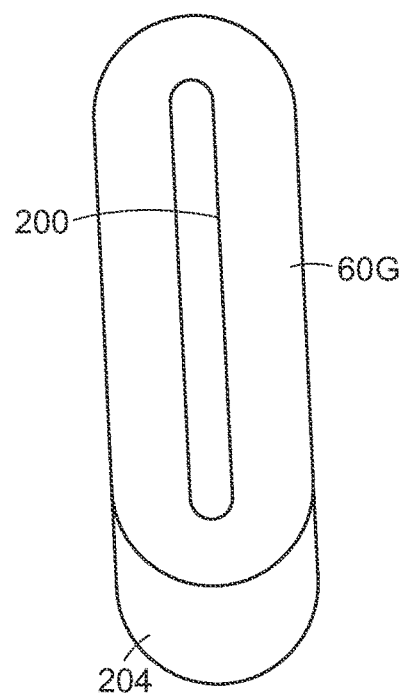
FIG. 35 is an elevation view of the leg of the submergible stool of FIG. 34.

Another embodiment of a stool 10N is illustrated in FIGS. 34-35, in which each of a plurality of legs 60G is racetrack shaped with a central slot 200. Each of a plurality of threaded knobs 202 may extend through sidewall 22 of body 11 of stool 10N and be threadingly engaged at a desired position along slot 200 of a corresponding leg 60G. Thus, each leg 60G can be vertically adjusted to a proper height so that body 11 of stool 10N can maintain its vertical orientation when bottom 16 of pool 20 is inclined.

As illustrated in FIG. 35 a tread 204 may be secured to the bottom of each leg 60G to provide grip and traction on bottom 16 of pool 20. Tread 204 may be formed of rubber or any other suitable soft and pliable material that can provide grip and traction for leg 60G on bottom 16.

Legs 60 G may be formed of metal so that they act as weights to help stool 10N right itself when it is dropped in pool 20.

Various embodiments of a submergible stool have been described herein, which include various components and features. In other embodiments, the submergible stool may be provided with any combination of such components and features. It is also understood that in other embodiments, the various devices, components, and features of the submergible stool described herein may be constructed with similar structural and functional elements having different configurations, including different ornamental appearances.

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above examples, but is encompassed by the following claims.

What is claimed is:

1. A submergible device comprising:
    a body including a top, a bottom spaced from the top, and a sidewall extending between the top and the bottom and defining an enclosed interior cavity extending between the top, the bottom, and the sidewall;
    a first aperture formed in the sidewall proximate the bottom and extending from the enclosed interior cavity to an exterior of the device;
    an additional first aperture formed in the sidewall proximate the bottom and opposite the first aperture, and extending from the enclosed cavity to an exterior of the device;
    a second aperture formed in the sidewall proximate the top and extending from the enclosed interior cavity to an exterior of the device,
    a peripheral wall extending upwardly about a portion of the top and defining a seat, the second aperture being formed in the peripheral wall; and
    a recess extending inwardly from an outer surface of the sidewall and including a bottom surface and a rear wall extending upwardly and inwardly from a rear edge of the bottom surface;
    wherein the apertures are positioned such that when the device is placed in a body of water, water will flow into the interior cavity through the first aperture and the additional first aperture, air will be forced out of the second aperture, and the device will sink to a bottom of the body of water in an upright position.

2. The submergible device of claim 1, wherein the bottom surface of the recess slopes downwardly from the rear edge to a front edge thereof.

3. The submergible device of claim 1, wherein the bottom surface of the recess is textured.

4. The submergible device of claim 1, wherein the seat is textured.

5. The submergible device of claim 1, further comprising a channel formed about a periphery of the seat, the channel being pitched downwardly from a rear of the seat toward a front of the device such that water will flow off the seat toward the bottom.

6. The submergible device of claim 1, further comprising:
    a plurality of threaded recesses extending upwardly into the bottom;
    a plurality of legs, each leg received in one of the recesses and comprising:
        a cover including exterior threads engaging threads of the one of the recesses and a cavity; and
        a weight received in the cavity of the cover.

7. A submergible device comprising:
    a body including a top, a bottom spaced from the top, and a sidewall extending between the top and the bottom and defining an enclosed interior cavity extending between the top, the bottom, and the sidewall;
    a first aperture formed in the sidewall proximate the bottom and extending from the enclosed interior cavity to an exterior of the device;
    a second aperture formed in the sidewall proximate the top and extending from the enclosed interior cavity to an exterior of the device;
    a base spaced from the bottom of the body; and
    a plurality of legs extending between the base and the body;
    wherein the apertures are positioned such that when the device is placed in a body of water, water will flow into the interior cavity through the first aperture, air will be forced out of the second aperture, and the device will sink to a bottom of the body of water in an upright position.

8. The submergible device of claim 7, further comprising a weight seated in a recess formed in a top surface of the base.

9. The submergible device of claim 7, wherein the legs are threaded rods.

10. The submergible device of claim 7, further comprising:
    a plurality of cavities formed in the bottom of the body, an upper end of each leg being received in an insert received in one of the cavities in the body; and
    a plurality of cavities formed in the base; a lower end of each leg including a pivotable knob received in one of the cavities in the base.

11. The submergible device of claim 10, wherein each cavity in the base includes a reduced thickness neck portion, each of the pivotable knobs of the legs being positioned below one of the reduced thickness neck portions in a corresponding cavity in the base.

12. A submergible device comprising:
    a body including a top, a bottom spaced from the top, and a sidewall extending between the top and the bottom and defining an enclosed interior cavity extending between the top, the bottom, and the sidewall;
    a first aperture formed in the sidewall proximate the bottom and extending from the enclosed interior cavity to an exterior of the device;
    a second aperture formed in the sidewall proximate the top and extending from the enclosed interior cavity to an exterior of the device;
    a plurality of telescoping legs extending downwardly from the bottom of the body;
    wherein the apertures are positioned such that when the device is placed in a body of water, water will flow into the interior cavity through the first aperture, air will be forced out of the second aperture, and the device will sink to a bottom of the body of water in an upright position.

13. The submergible device of claim 12, further comprising a plurality of leg housings secured to the bottom of the body, each of the legs being received in one of the leg housings.

14. The submergible device of claim 13, wherein:
    each leg is hollow and cylindrical, and includes a plurality of apertures extending in a row, and
    each leg housing includes a retractable button selectively receivable in the apertures in one of the legs.

15. The submergible device of claim 12, wherein an upper end of each leg may move upwardly and downwardly within a cavity formed in the bottom of the body.

16. The submergible device of claim 12, further comprising a thread secured to a bottom of each leg.

17. The submergible device of claim 12, further comprising:
   a recess formed in a central portion of the bottom of the body; and
   a weight received in the recess.

18. The submergible device of claim 17, further comprising a net suspended from the body beneath the weight and configured to retain the weight within the recess.

19. The submergible device of claim 18, further comprising a plurality of posts extending outwardly from the bottom of the body, the net being suspended from the posts.

20. The submergible device of claim 17, wherein the weight comprises a bag.

* * * * *